INVENTOR.
Finn T. Irgens
BY
Wheeler, Wheeler & Wheeler
ATTORNEYS.

Oct. 4, 1966

F. T. IRGENS 3,276,285

SINGLE LEVER CONTROL

Filed Sept. 30, 1964

INVENTOR.
FINN T. IRGENS
BY
Wheeler, Wheeler & Wheeler
ATTORNEYS

United States Patent Office 3,276,285
Patented Oct. 4, 1966

3,276,285
SINGLE LEVER CONTROL
Finn T. Irgens, Milwaukee, Wis., assignor to Outboard Marine Corporation, Waukegan, Ill., a corporation of Delaware
Filed Sept. 30, 1964, Ser. No. 400,416
8 Claims. (Cl. 74—470)

The invention relates generally to controls for remote shifting of clutches, such as are included in marine propulsion devices, as for instance, in outboard motors and in stern drive units.

One of the major sources of wear in mechanically actuated clutches results from gradual engagement. In some prior control devices, clutch engagement was more or less gradually achieved and it was possible to manually locate the control lever in a position which was effective to only partially complete engagement of the clutch. The invention disclosed herein provides a control which affords rapid clutch engagement and avoids the possibility of partial clutch engagement.

In the disclosed embodiment, there is provided a movably mounted, clutch actuating member which is adapted to be connected to a push-pull cable affording operation of a remote clutch and which is releasably restrained in a neutral position and automatically and rapidly shifted from its neutral position to a clutch engaging position in response to release from its neutral position. The invention also provides for means releasably restraining movement of the clutch actuating member and manually operable means for releasing the restraining means, thereby affording displacement of the clutch actuating member between its alternate positions.

In this regard, spring means are interposed between the clutch actuating member and the manually movable member for receipt and storage of energy by reason of movement of the manually movable member when the clutch actuating member is retained in its central or neutral position. Upon release of the clutch actuating member by the releasable restraining means, the energy previously stored in the spring affords clutch shifting movement of the clutch actuating member.

Other objects and advantages of the invention will become known by reference to the following description and the accompanying drawings in which.

Figure 1:
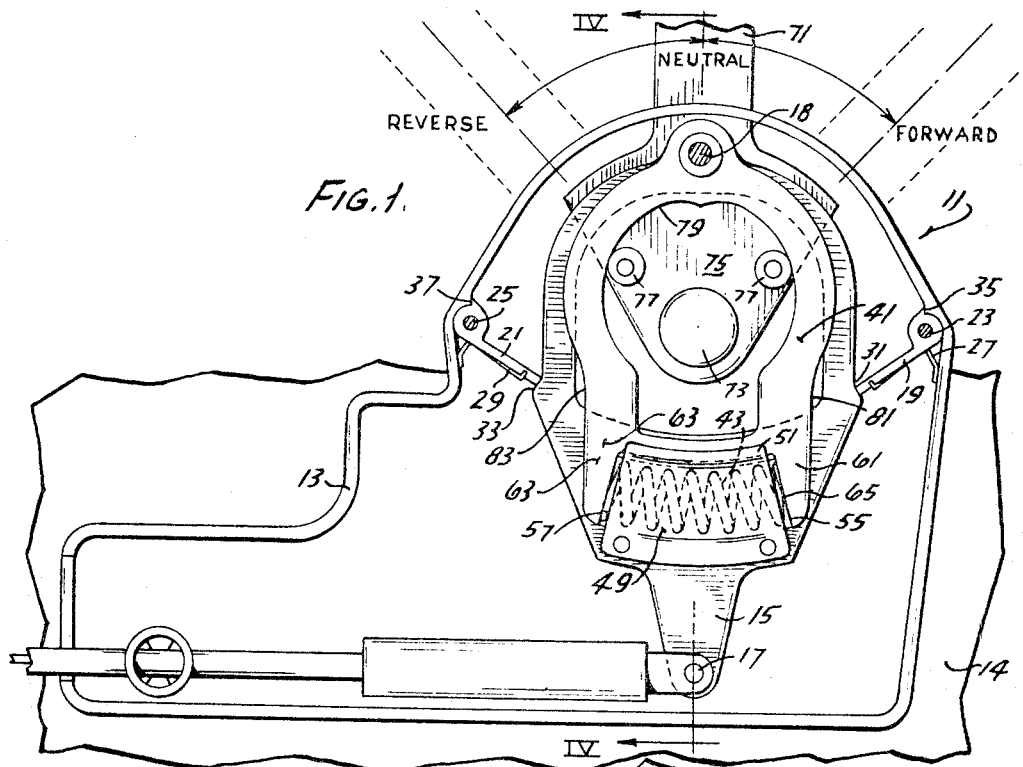
FIGURE 1 is an elevational view, partially in section, and with parts omitted, of a control device embodying various of the features of the invention and with the components shown in position affording clutch disengagement.
Figure 2:
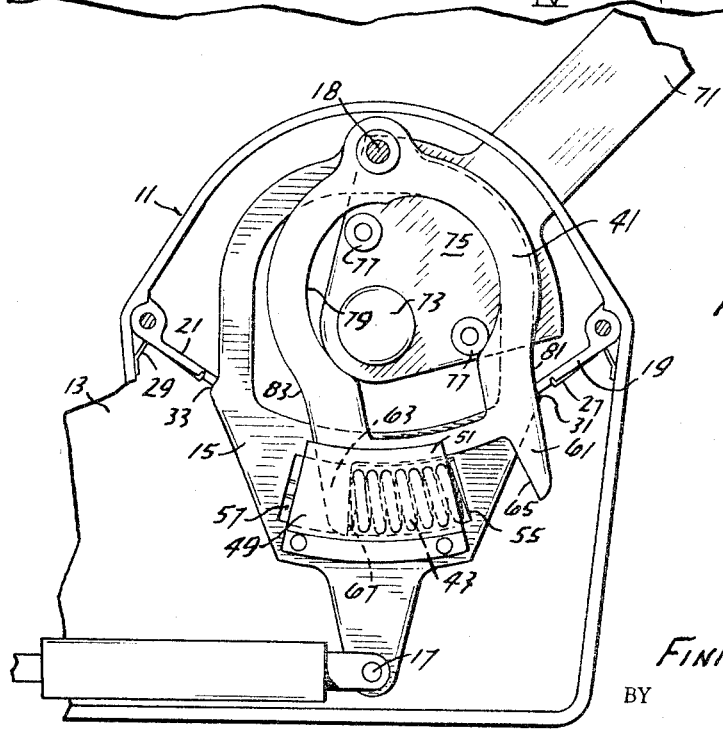
FIGURE 2 is a fragmentary view similar to FIGURE 1 showing various of the components immediately prior to operation of the device to effect clutch engagement.
Figure 3:
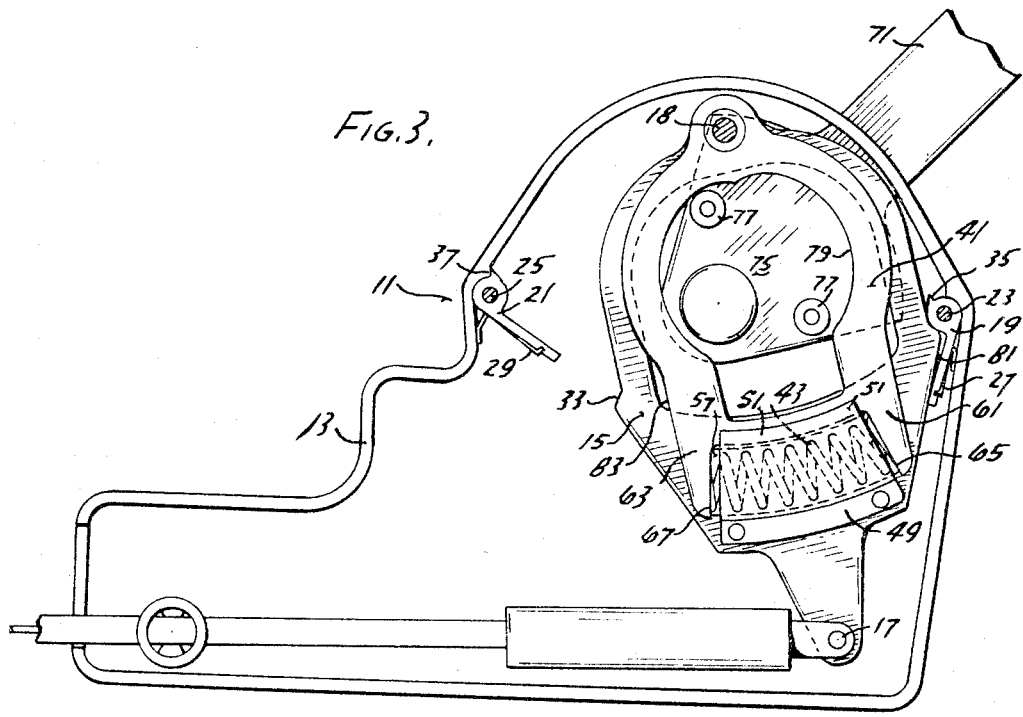
FIGURE 3 is a view similar to FIGURE 2 illustrating various of the components in a position affording clutch engagement.

The control device which is shown in the drawings is merely representative of various arrangements in accordance with the invention for affording rapid engagement of a remotely located clutch. The device 11 includes a frame or housing 13 which is adapted to be mounted to the hull 14 of a boat, and an automatically shiftable, clutch actuating member or lever 15 which includes means 17 adapted for connection to a push-pull cable. The clutch actuating member 15 is mounted at a point spaced from the means 17 adapted for connection to a push-pull cable by means including a stud 18 fixed to the frame 13 for movement between a central or neutral position affording disengagement of the clutch and each of two positions respectively spaced on opposite sides of the central or neutral position and respectively affording forward and rearward clutch engagement.

In accordance with the invention, means are provided for releasably restraining shifting of the clutch actuating member 15 from its central or neutral position to either of its two clutch engaging positions. While various arrangements can be employed, the illustrated arrangement includes a pair of pawls or fingers 19 and 21 which are respectively mounted on studs 23 and 25 fixed in the frame 13 in spaced relation to and on opposite sides of the central or neutral position of the clutch actuating member 15. In addition, biasing means in the form of respective springs 27 and 29 are provided to locate the pawls 19 and 21 in engagement with respective edge portions 31 and 33 of the clutch actuating member 15 to prevent movement thereof from its central or neutral position. The clutch-actuating-member-movement preventing positions are determined by engagement of respective shoulders 35 and 37 on the pawls with associated stops on the frame 13.

Also carried by the frame 13 is a second or manually movable member, lever, or arm 41 which is mounted for pivotal movement about the stud 18 for movement between a first or central position associated with a neutral clutch condition and either of oppositely spaced positions respectively associated with forward and rearward clutch engagement. The manually movable arm 41 is connected to the clutch actuating member 15 by resilient means affording storage of energy in response to movement of the movable arm 41 from its first position to either of its oppositely spaced positions when the clutch actuating member 15 is retained against movement by the pawls 19 and 21.

Figure 4:
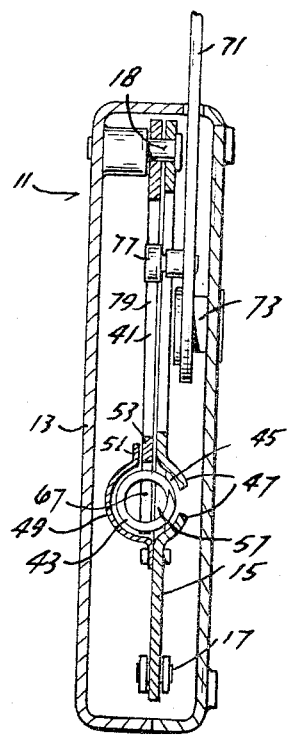
FIGURE 4 is a fragmentary sectional view taken generally along line 4—4 of FIGURE 1.

More particularly, in the disclosed construction, the energy storage means is in the form of a helical compression spring 43 which is maintained in a housing 45 (see FIGURE 4) formed by an arcuate segment 47 of the clutch actuating member 15 and by an arcuate cover 49 which is secured to the clutch actuating member 15 along its lower edge and which has a free upper edge 51 spaced from the clutch actuating member 15 to define a clot 53. At each of the ends of the spring housing 45 are respective edges 55 and 57 which are formed in the clutch actuating member 15 and which serve as spring seats.

Extending into the slot 51 to afford compression of the spring 43 and the consequent storage of energy therein are a pair of fingers 61 and 63 which extend downwardly from the manually movable arm 41 and which are spaced at a distance corresponding to, or slightly in excess of, the distance between the edges 55 and 57. The opposed edges 65 and 67 of the respective fingers 61 and 63 also serve as spring abutments or seats, as will be seen.

In accordance with the invention, means are also provided for rocking the manually movable arm 41 from the central position associated with a neutral clutch condition to each of the positions associated with rearward and forward clutch engagements. Various arm rocking means well known in the art may be employed. In the disclosed construction, such means is in the form of a hand lever 71 which is pivotally mounted by the frame 13 about the axis of a stud 73. Carried within the frame 13 on an enlarged part 75 of a hand lever 71 are a pair of rollers 77 which engage a cam slot 79 on the manually movable arm 41 so that, in response to pivotal movement of the hand lever 71 in one direction, the manually movable arm 41 is rocked in the opposite direction.

Means are provided to release the restraining engagement of the pawls 19 and 21 with the clutch actuating member 15 when the manually movable arm 41 is located in either of its positions associated with clutch engagement. Movement of the arm 41 to either of such positions also serves to store energy in the spring 43 by reason of engagement of one of the edges 65 and 67 of the fingers 61 and 63 with one end of the spring 43, while the other spring end is seated against the opposing one of the clutch actuating member edges 55 and 57.

While various release means can be provided, in the disclosed construction, such means takes the form of respective camming edges 81 and 83 on the manually movable arm 41, which edges 81 and 83, upon approach of the arm 41 to the positions associated with clutch engagement, respectively engage the pawls 19 and 21 to displace the pawls against the action of the respective springs 27 and 29 from positions restraining movement of the clutch actuating member 15.

Consequently, upon release of the clutch actuating member 15, the energy stored in the compression spring 43 quickly and automatically displaces the clutch actuating member 15 to one of its clutch engaging positions. As a result, the push-pull cable is quickly displaced and clutch engagement takes place relatively rapidly during a relatively small time interval, thereby effectively reducing clutch wear.

When the hand lever 71 is returned to its central or neutral position from either of its positions associated with clutch engagement, the clutch actuating member 15 will also be returned to its central or clutch disengaging position by action of the spring 43. Upon return of the clutch actuating member 43 to its central or neutral position, the pawls 19 and 21 are returned to their positions engaging the edge portions 31 and 33 of the clutch actuating member to releasably restrain further movement of the clutch actuating member 15 until the manually movable arm 41 is again displaced to one of its positions associated with clutch engagement, whereby the spring 43 will automatically cause clutch engaging movement of the member 15.

While the disclosed construction has been confined to a control solely incorporating components for effecting clutch actuation, it is to be understood that the features of the invention apply also to the so-called "single lever controls" in which both throttle and clutch control are coordinated.

Various of the features of the invention are set forth in the following claims.

What is claimed is:

1. A control adapted for operation of a remotely located clutch, said control comprising a frame, a clutch actuating member movably mounted on said frame for movement from a first position, an arm movably mounted on said frame and including means adapted to afford manual movement thereof from a neutral position, resilient means interposed between said clutch actuating member and said arm to locate said clutch actuating member in accordance with the position of said arm, means releasably restraining movement of said clutch actuating member from said first position, and means on said arm for actuating said movement restraining means to release said clutch actuating member for movement after a given amount of arm movement from said neutral position, whereby said clutch actuating member is then displaced by said resilient means to a position located in accordance with the position of said arm.

2. A control for axially displacing a push-pull cable, said control comprising a frame, a member including means adapted to be connected to a push-pull cable, means on said frame movably mounting said member at a point spaced from said means adapted to be connected to said push-pull cable so as to afford displacement of said last-mentioned means in response to movement of said member from a given position, an arm movably mounted on said frame and including means adapted to afford manual movement thereof from a neutral position, resilient means interposed between said member and said arm to locate said member in accordance with the position of said arm, means releasably restraining movement of said member from said given position, and means on said arm for actuating said movement restraining means to release said member for movement after a given amount of arm movement from said neutral position, whereby said member is then displaced by said resilient means to a position located in accordance with the position of said arm.

3. A control adapted for operation of a remotely located clutch, said control comprising a frame, a clutch actuating member movably mounted on said frame for movement between a pair of opposed positions and an intermediate central position, an arm movably mounted on said frame and including means adapted to afford manual movement thereof to either side of a central neutral position, resilient means interposed between said clutch actuating member and said arm to locate said clutch actuating member in accordance with the position of said arm, a pair of fingers, means movably mounting said fingers on said frame for movement relative to respective positions restraining movement of said clutch actuating member from said central position to each of said opposed positions, means biasing said fingers toward said positions, and means on said arm for displacing said fingers from said positions against the action of said biasing means after a given amount of arm movement in either direction from its central position, whereby said clutch actuating member is then displaced by said resilient means to locate said clutch actuating member in accordance with the position of said arm.

4. A control adapted for operation of a remotely located clutch, said control comprising a frame, a clutch actuating member movably mounted on said frame for movement from a first position, an arm movably mounted on said frame for movement from a neutral position, a manually operable lever movably mounted on said frame, means connecting said lever and said arm to cause arm movement in response to lever movement, resilient means interposed between said clutch actuating member and said arm to locate said clutch actuating member in accordance with the position of said arm, means releasably restraining movement of said clutch actuating member from said first position, and means on said arm for actuating said movement restraining means to release said clutch actuating member for movement after a given amount of arm movement from said neutral position, whereby said clutch actuating member is then displaced by said resilient means to a position located in accordance with the position of said arm.

5. A control adapted for operation of a remotely located clutch, said control comprising a frame, a stud on said frame, a clutch actuating member carried by said stud for movement from a first position, an arm carried by said stud for movement from a neutral position, means on said arm affording manual movement thereof, resilient means interposed between said clutch actuating member and said arm to locate said clutch actuating member in accordance with the position of said arm, means releasably restraining movement of said clutch actuating member from said first position, and means on said arm for actuating said movement restraining means to release said clutch actuating member for movement after a given amount of arm movement from said neutral position, whereby said clutch actuating member is then displaced by said resilient means to a position located in accordance with the position of said arm.

6. A control adapted for operation of a remotely located clutch, said control comprising a frame, a clutch actuating member movably mounted on said frame for movement from a first position, an arm movably mounted on said frame and including means adapted to afford manual movement thereof from a neutral position, resilient means interposed between said clutch actuating member and said arm to locate said clutch actuating member in accordance with the position of said arm, a finger engageable with said clutch actuating member to restrain displacement of said clutch actuating member from said first position, a stop on said frame, means movably mounting said finger on said frame, means biasing said finger toward a position which is defined by engagement of said finger with said stop and which restrains movement of said clutch actuating member from said first position, and means on said arm for displacing said finger from said restraining position against the action of said biasing means after a given amount of arm movement from said neutral position, whereby said clutch actuating member is then displaced by said resilient means to a position located in accordance with the position of said arm.

7. A control adapted for operation of a remotely located clutch, said control comprising a frame, a clutch actuating member movably mounted on said frame for movement from a first position, a housing on said clutch actuating member having therein a slotted opening and spaced edges extending transversely with respect to said opening, an arm movably mounted on said frame for movement relative to a neutral position, means on said arm adapted to afford manual arm movement relative to said neutral position, spaced abutments on said arm extending into said housing opening, a compression spring located in said housing between said edges and said abutments to locate said clutch actuating member in accordance with the position of said arm, means releasably restraining movement of said clutch actuating member from said first position, and means on said arm for actuating said movement restraining means to release said clutch actuating member for movement after a given amount of arm movement from said neutral position, whereby said clutch actuating member is then displaced by said spring to a position located in accordance with the position of said arm.

8. A control adapted for operation of a remotely located clutch, said control comprising a frame, a stud on said frame, a clutch actuating member carried by said stud for movement from a first position, a housing on said clutch actuating member having therein a slotted opening and spaced edges extending transversely with respect to said opening, an arm carried by said stud for movement relative to a neutral position, a manually operative lever movably mounted on said frame, means connecting said lever and said arm to cause arm movement in response to lever movement, spaced abutments on said arm extending into said housing opening, a compression spring located in said housing between said edges and said abutments to locate said clutch actuating member in accordance with the position of said arm, a finger engageable with said clutch actuating member to restrain displacement of said clutch actuating member from said first position, a stop on said frame, means movably mounting said finger on said frame, means biasing said finger toward a position which is defined by engagement of said finger with said stop and which restrains movement of said clutch actuating member from said first position, and means on said arm for displacing said finger from said restraining position against the action of said biasing means after a given amount of arm movement from said neutral position, whereby said clutch actuating member is then displaced by said spring to a position located in accordance with the position of said arm.

References Cited by the Examiner
UNITED STATES PATENTS
2,385,026 9/1945 Pierce _____ 74—97
2,626,527 1/1953 Meyers _____ 74—97

FRED C. MATTERN, Jr., *Primary Examiner.*

J. D. PUFFER, *Assistant Examiner.*